United States Patent [19]
Ainscow et al.

[11] Patent Number: 5,428,723
[45] Date of Patent: Jun. 27, 1995

[54] METHOD AND APPARATUS FOR CAPTURING THE MOTION OF AN OBJECT IN MOTION VIDEO

[75] Inventors: Frank Ainscow, Winchester; Kerry J. Mashford, Olney, both of United Kingdom

[73] Assignee: International Business Machines Corporation, Armonk, N.Y.

[21] Appl. No.: 942,240

[22] Filed: Sep. 9, 1992

[51] Int. Cl.6 .................................................. G06T 7/20
[52] U.S. Cl. ..................................... 395/135; 395/152
[58] Field of Search ................................. 395/133–135, 395/152, 153, 155, 156, 161; 340/709

[56] References Cited

U.S. PATENT DOCUMENTS

| | | | |
|---|---|---|---|
| 3,911,419 | 10/1975 | Bates et al. | 340/709 |
| 4,761,640 | 8/1988 | Slavin | 340/709 |
| 4,791,478 | 12/1988 | Tredwell et al. | 340/709 X |
| 4,847,604 | 7/1989 | Doyle | 340/709 X |
| 4,847,605 | 7/1989 | Callahan et al. | 340/709 |
| 4,857,902 | 8/1989 | Naimark et al. | 340/709 |
| 5,214,711 | 5/1993 | Neely et al. | 364/413.02 X |

Primary Examiner—Almis R. Jankus
Attorney, Agent, or Firm—Martin J. McKinley

[57] ABSTRACT

A method and apparatus for analysing the motion of an object in an motion video in which the frame of a video image (suitably converted to graphics format) is displayed on a video display unit and overlaid by a graphics image including a mouse pointer. The mouse is manipulated by the user to capture the pixel coordinates of the desired object in successive frames of the video thereby providing data which represents the variation in position of the object with time.

2 Claims, 3 Drawing Sheets

| POINT # \ FRAME # | 0 | 1 | 2 | | 99 |
|---|---|---|---|---|---|
| 0 | $X_{00}Y_{00}$ | $X_{01}Y_{01}$ | | | |
| 1 | $X_{10}Y_{10}$ | $X_{11}Y_{11}$ | | | |
| 2 | | | | | |
| 99 | | | | | |

FIG. 3

| POINT #  /  FRAME # | 0 | 1 | 2 | | 99 |
|---|---|---|---|---|---|
| 0 | $X_{00}Y_{00}$ | $X_{01}Y_{01}$ | | | |
| 1 | $X_{10}Y_{10}$ | $X_{11}Y_{11}$ | | | |
| 2 | | | | | |
| 99 | | | | | |

METHOD AND APPARATUS FOR CAPTURING THE MOTION OF AN OBJECT IN MOTION VIDEO

TECHNICAL FIELD

This invention relates to the analysis of the motion of objects in video images.

BACKGROUND ART

The motion of a visible object can be readily recorded using a video camera, either in real time or using a high-speed or time-lapse technique. The resulting recording can be analysed frame by frame to extract numerical information about he motion. This technique is particularly effective if the motion is constrained to lie within a known plane, so that only two dimensional data need be captured.

The step of this process which presents most difficulty is the measurement of the object position in the video frame with sufficient accuracy to identify small perturbations in the motion. Three main techniques have been used to measure coordinates of points in video recordings. In a first technique, one or more measuring scales are incorporated in the original image, and the position is read using the scale(s). This method depends on the correct preparation of the subject and is not practicable when the subject is very large or very small. Fine scale graduations may be lost owing to the finite resolution of the video recording.

In a second prior technique, the position of the object is measured directly at the screen using a ruler. This method is laborious and subject to parallax error. Furthermore, the position of the image on the screen is somewhat variable because of jitter and line-tearing effects taking place on the display device.

In a third technique, the image is projected on to a drawing board and manual measurement is carried out using squared paper, a draughting machine or a simple ruler. This method is also laborious and parallax error is replaced by error due the relative movement of the projector and screen. In common with the second technique, jitter and line-tearing effects are also present.

SUMMARY OF THE INVENTION

It is therefore an object of the present invention to provide a method and means which addresses the problems of the prior art object measurement techniques. In accordance with this object, the present invention provides a method for determining the position of an object in a video image comprising he steps of : providing a computer display screen; converting the video image from video format into a graphics format such as VGA; displaying said converted video image including said object on said display screen; overlaying said displayed video image with a computer generated graphics image including a pointer; positioning said pointer over the object; and recording the position of said pointer as defined by the coordinate system of the computer generated image.

The invention also provides an apparatus for determining the position of an object in a video image.

Although the technique of capturing the position of one or more objects in a single image will meet the requirements of various applications, it is preferred to include the further steps of displaying successive video frames of a motion video on the display screen and, on a frame by frame basis, recording the position of the pointer on said object in each of said successive frames and saving the recorded coordinate positions in memory.

The principal advantage offered by the technique of the present invention over the prior art methods described above is the accuracy of capture of coordinate information. The achievable resolution in object position is limited primarily by the resolution of the display screen used. Because the video image and the cursor are being displayed by the same device, all misregistration effects are eliminated. If jitter or line-tearing are present in the display device, they affect both the image and the cursor equally so the effect is nullified. For the same reason, parallax is also eliminated.

The technique has further advantages in that the convenience and speed of operation are greatly improved. The entire process may be carried out at the desk, using ergonomically satisfactory devices. This in turn allows more information to be captured so that more detailed analysis can be done.

BRIEF DESCRIPTION OF THE DRAWINGS

FIG. 3 shows the format of an array in which is stored the coordinates of points captured according the the method of the present invention.

DETAILED DESCRIPTION OF THE INVENTION

Video overlay is the process of merging a video signal with the graphical or textual output of a computer in such a way that the graphics or text appear to lie on top of the video image. In the present invention, the technique of video overlay is employed to provide an elegant solution to the problem of analysing the motion of objects in a motion video.

Generally, either the video or the graphics is required to occupy a rectangular area within a screen otherwise occupied by the other image. The impression is given that one is looking through a transparent window in one plane, to see a portion of a second plane behind it and this metaphor has become commonplace as a way of describing the merging of graphics and video. Often it is convenient to define the area of the screen to be occupied by he video image by setting that area of the graphics image to a predefined colour—so allowing irregular shapes and the superimposition of graphics and text over the video. An extension of the image plane metaphor identifies the colour as transparent since it allows the video to show through. All of this leads to the concept of a device which assembles computer graphics and motion video into two separate image planes and overlays one on top of the other. Normally the video plane is regarded as underneath, and the graphics plane is overlaid upon it, but it could equally well be the other way round. A device which does this is called quite naturally a video overlay adapter. Examples of video overlay devices which are currently in he marketplace include the IBM M-Motion Adapter/A for the IBM PS/2 personal computer (PS/2 is a trademark of IBM Corporation), Screen Machine from FAST GmbH and the VideoLogic DVA series.

Figure 1:
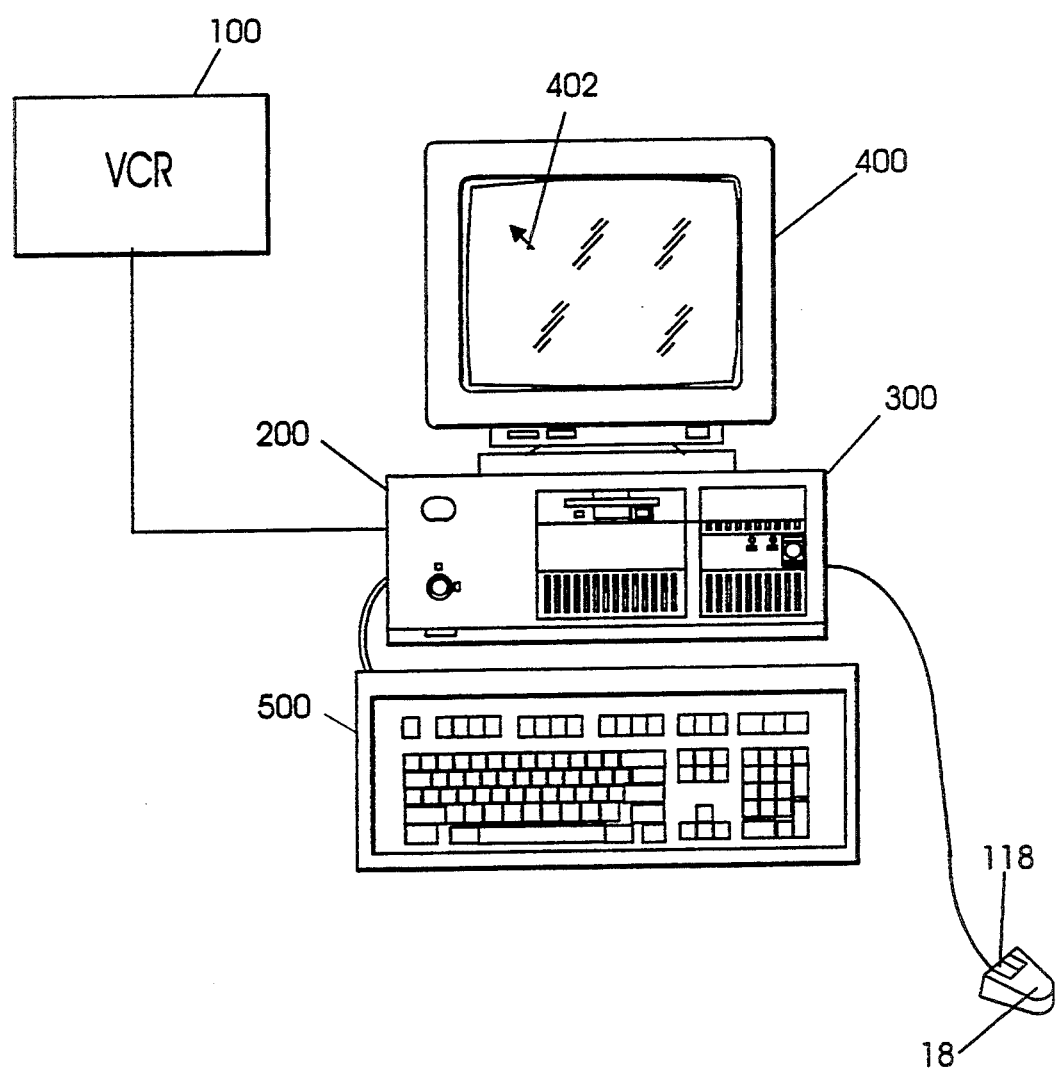
FIG. 1 shows, in schematic form, the main components of a system suitable for implementing the present invention.

Referring to FIG. 1, there is shown an assembly of apparatus by means of which the present invention is implemented. Monitor 400, Computer System Unit and Keyboard 500 form a conventional personal computer such as the IBM PS/2 computer employing the IBM Micro Channel Architecture. A mouse 18 is connected to the system unit and is used to move mouse pointer 402 on the screen of the monitor. Located in one of the slots of the computer system unit is an adapter 200, which in the preferred embodiment is the IBM M-Motion Adapter/A. For reasons of clarity the adapter 200 is shown in FIG. 1 as a portion of the system unit. Attached to the adapter is a Video Cassette Recorder (VCR) 100. The VCR is the source of video material which is processed using the technique of the present invention. It will be appreciated that other sources of video e.g. Videodisc may be used equally well.

Figure 2:
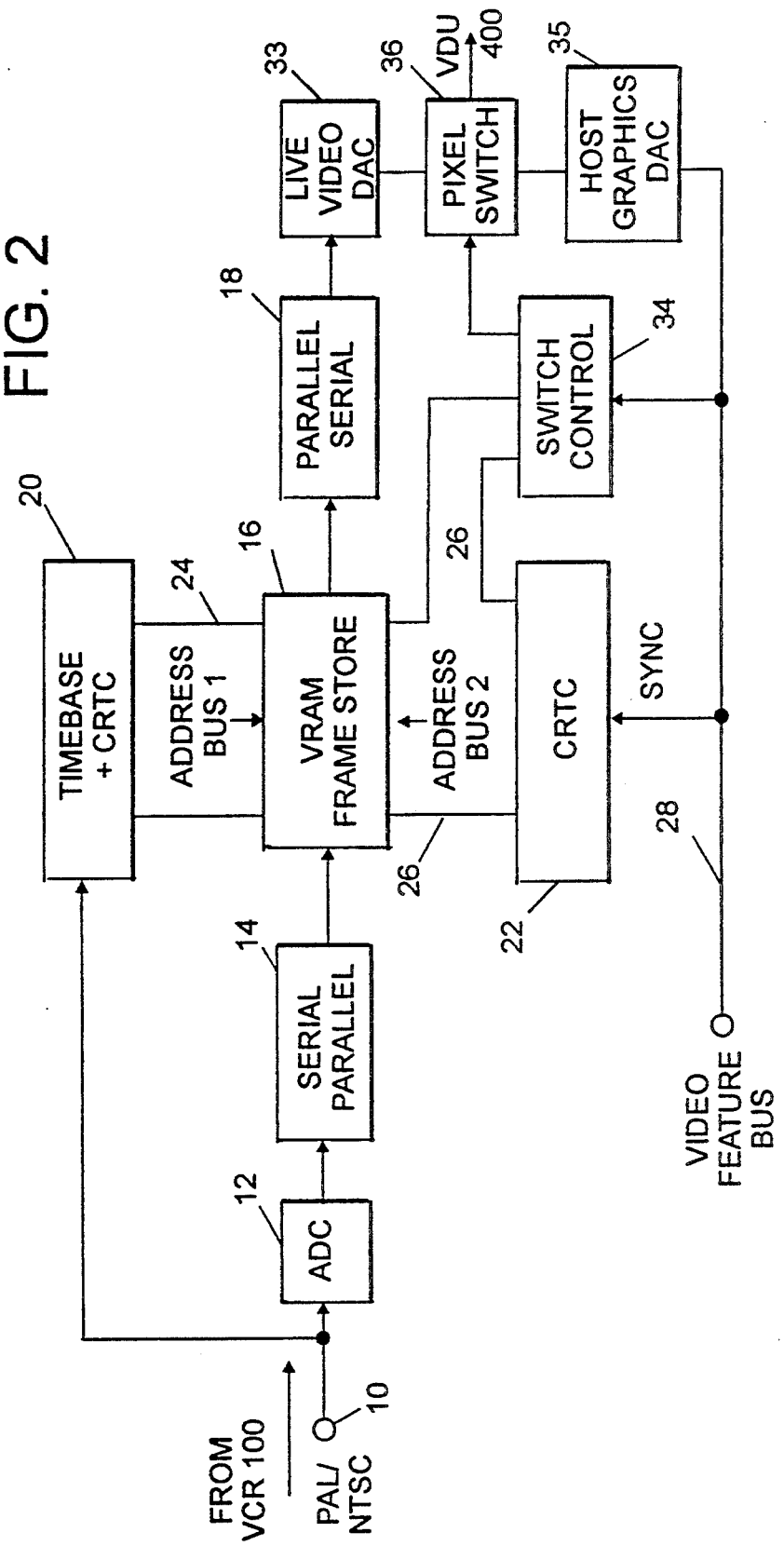
FIG. 2 shows in block diagrammatical form the main components of the video overlay device.

The process of taking a video signal which is encoded according to one of a number of encoding standards e.g. PAL, SECAM, NTSC and converting into a suitable graphics format e.g. CGA, EGA, VGA for presentation on a computer display will be described, in brief, with reference to the IBM M-Motion Adapter/A card, shown in block diagrammatical form in FIG. 2. The adapter operates under the control of an associated computer program called the IBM M-Control program. Other video overlay devices available on the market operate in a similar though not necessarily identical manner.

The video signal representing a motion video which may be in PAL or NTSC format is supplied from the VCR 100 on a frame by frame basis to a connector 10 of the adapter card, which car is located in a slot of the IBM PS/2 personal computer. In order to convert the video stream into a graphics format such as VGA, the analogue video signal is firstly digitised by ADC 12 which samples and converts the signal at a rate sufficient to preserve the visual information content. Typically tis will entail sampling at a rate of one sample every 100 ns. The resulting digital data is then converted into a parallel stream by converter 14 and stored into VRAM Frame store 16 at the same rate as operating rate of the ADC 12. If two bytes per pixel are used, this implies a data transfer rate of 20 Megabytes per second.

The VRAM 16 is designed to hold at least one complete frame of video in memory at all times. For a 640 pixel×480 pixel image, this requires about 600 kB of fast video memory. The frame held in the buffer is retrieved and converted back into serial form by converter 18 and passed to the Live Video DAC 33 where it is converted back to analogue form. The resultant analogue video signal is then supplied to pixel switch 36 at the rate used by the computer dispaly—typically one pixel every 50 ns, implying a data rate of 40 Megabytes per second.

The VRAM addresses for storage of the incoming video pixel values are generated by timebase/CRTC 20, and applied to the VRAM via address bus 24. Addresses for the retrieval of pixel values from VRAM are generated by a second CRTC 22, and applied to the VRAM via address bus 26. CRTC 20 is synchronised to the incoming video signal, whilst CRTC 22 is synchronised to the computer generated graphics signal, which, in the case of an IBM PS/2, is carried to the adapter card by the Video Feature bus 28.

Although it is possible to process the video image further by, for example, changing the size of the image, the present invention achieves greatest precision if an exact one-to-one correspondence is maintained between the pixels of the incoming video and those of the displayed image.

Merging of the video and graphics images is achieved by pixel switch 36, which selects, on a pixel by pixel basis, either the video signal from VRAM 16 or the computer graphics signal, which has been converted to analogue form by Host Graphics DAC 35. The pixel switch is controlled via Switch control 34 by a signal derived from a comparison of the current VRAM read address with a predefined rectangle and/or from a comparison of the current graphics colour with a predefined 'transparent' colour.

Having described in broad terms the method by which video and graphics are merged on a computer display, next will be described the method by which a mouse pointer is employed to capture the coordinates of an object in the video image. Given the following description, the writing of the necessary implementation code is a routine matter for the skilled programmer.

In the preferred embodiment a point capture program operates in conjunction with the M-Motion adapter card and control program. However, it will be appreciated that the technique of the present invention may readily be used in association with other video overlay devices on the market and also with future devices.

In the point capture program, the maximum number of video frames which may be processed and the maximum number of points in each frame are predefined. As an alternative to this arrangement, the point capture program could be designed to allow the user to choose the values of the maximum number of frames and maximum number of points within a frame at the start of the program, thus providing greater user flexibility. At the beginning of the program an array is defined in memory which has the format shown in FIG. 3. During operation of the point capture process, the pixel coordinates of the captured points are placed in the appropriate location within the array. Also defined by the program is the area of the display screen which is allocated to a video frame. Using the IBM M-Motion Adaper/A and associated M-Control program it is possible to place the video within an arbitrarily sized window on the display screen. However in the present invention, it will be appreciated that it is desirable to allocate as large an area of the display screen as possible for the video image, subject to maintaining the aspect ratio, in order to achieve maximum accuracy in determining the position of an object within that image. For VGA mode the maximum screen area comprises 640×480 pixels. A pair of variables is also defined at the outset of the program namely frame_index which identifies the current working frame number and point_index which defines the point number within a frame.

Before the first frame is processed, frame_index and point_index are both set to zero to signify the first frame of the video and the first point therein. The first frame of the video which contains the objects whose motion is to be analysed is transferred from the VCR to the VRAM frame store and consequently displayed in the predefined area of the screen. Using mouse 18 (FIG. 1), the user positions a mouse pointer 402 (whose shape and colour may be defined by the user prior to execution of the program) over the object of interest within he video frame. The pixel coordinate position of the mouse on the screen is available to the program through a function of the computer operating system, for example DOS interrupt 33H or OS/2 function MouGetPtrPos.

The point capture program, on depression of the left button 118 of the mouse, obtains the value of the pointer position and writes it into the array in memory. For the first point of the first frame in the sequence of frames, the value of frame_index and point_index are both zero and the values written to the array are X00 and Y00. After the values are written to the array, the value of point_index is incremented to 1. If the user wishes to analyse the motion of a second point in the video image (to determine the relative motions of two objects, for example) then he moves the mouse to the required position of the second object and again depresses the left mouse button. The coordinate position of the mouse is captured and written to the file as X01 and Y01. Again the value of point_index is incremented.

When the user has completed processing of a first video frame, the point capture program is arranged to respond to a predefined keystroke input to bring a second frame to the screen. The value of frame_index is incremented and the value of point_index is reset to zero, signifying the first point of the second frame. The user then continues by moving the mouse pointer to the (perhaps) new position of the desired object and captures the coordinates by depressing the left mouse button. The coordinate values of the first point in the second frame are stored in the array as X10 and Y10.

This process is continued until the user either decides to halt the process or until the predefined maximum number of frame has been processed. If the process is halted part way through, then the data captured up to the time when the process was halted is stored in a file, named by the user. The current values of frame_index and point_index are stored with the point coordinate data. Thus when the point capture program is next invoked, the user is able to load the named file containing the data stored during a previous pass and is presented on the screen with the last processed frame and point saved for that frame. This facility finds advantageous use when the number of frames requiring processing is large.

In this way the coordinates of a number of objects in a video are a captured on a frame by frame basis and placed into a file in storage. The data in the file can then be manipulated as desired in order to provide the information required by the user—for 4example, an appropriate algorithm to allow kinematic analysis of the object. The different types of analysis which may be carried out do not form part of the present invention and will not be described.

It should be appreciated that although the preferred embodiment describes object position analysis on a frame by frame basis, the technique is readily extendable to analysis on a field by field basis (in video, a frame comprises odd and even interlaced fields). As the odd and even fields are separated in time, analysis on a field by field basis would provide more accurate timing assuming that the object appears in both odd and even fields.

The process of motion analysis using the technique of the present invention can be applied to the movement of human limbs and joints for use in medical diagnosis and sports coaching for example. In addition, in the creation of animated graphics for entertainment or information, realistic movement can readily be obtained by capturing the motion of a representative body from video.

The technique of the present invention finds further application in the analysis of the motion of machinery.

As an extension to the technique herein described, it would be possible to measure three dimensional movement of an object by capturing the positions of points in two synchronised video recording taken from different angles.

It should be understood that modifications and changes may be made by one of skill in the art to the preferred embodiment without departing from the scope of the invention.

We claim:

1. A method of capturing the movement of an object in a motion video, said motion video comprising a plurality of successive frames of video image data, comprising the steps of:

providing a computer display screen;

converting a first frame of said motion video from video format into a graphics format compatible with said computer display screen;

displaying said first frame including said object on said display screen;

overlaying said first frame with a graphics image including a pointer, said graphics image having a plurality of coordinate positions;

positioning said pointer over the object;

recording the coordinate position of said pointer as defined by said graphics image; and repeating he steps of converting, displaying, overlaying, positioning and recording for a second frame of said motion video, such that the motion of the object can be determined by comparing the coordinate position of the pointer from said first frame, with the coordinate position of the pointer from said second frame.

2. Apparatus for capturing the movement of an object in a motion video, said motion video comprising a plurality of successive frames of video image data, comprising:

a computer display screen;

means for converting first and second frames of said motion video from video format into a graphics format compatible with said computer display screen;

means for successively displaying said first and second frames including said object on said computer display screen;

means for overlaying said first and second frames with a graphics image including a pointer, said graphics image having a plurality of coordinate positions;

means for positioning said pointer over the object in said first and second frames; and means for recording a first coordinate position of said pointer positioned over the object in said first frame, and for recording a second coordinate position of said pointer over the object in said second frame, such that the motion of the object can be determined by comparing the first coordinate position with the second coordinate position.

* * * * *